(12) United States Patent
Da Silva et al.

(10) Patent No.: US 11,182,969 B2
(45) Date of Patent: Nov. 23, 2021

(54) SPATIAL LOCALIZATION USING AUGMENTED REALITY

(71) Applicants: Embraer S.A., São José dos Campos (BR); Servico Nacional de Aprendizagem Industrial, Departmento Regional da Bahia—SENAI/DR/BA, Sao Paulo (BR)

(72) Inventors: Paulo Anchieta Da Silva, São José dos Campos (BR); Gabriel de Oliveira Cruz Do Prado, São José dos Campos (BR); Fabio Mitsuhiko Simomura, São José dos Campos (BR); Andre Koji Fujimoto Tamba, São José dos Campos (BR); Glauco Humberto Gomes, São José dos Campos (BR); Kelson Luis de Oliveira Pereira, São José dos Campos (BR); Flavio Soares Ribeiro Junior, São José dos Campos (BR); Fabio Britto de Carvalho Almeida, Salvador (BR); Ingrid Winkler, Salvador (BR); Valéria Loureiro Da Silva, Salvador (BR)

(73) Assignees: EMBRAER S.A., São José dos Campos-SP (BR); SERVICO NACIONAL DE APRENDIZAGEM INDUSTRIAL, DEPARTMENTO REGINAL DE BAHIA—SENAI/DR/BA, Salvador (BR)

( * ) Notice: Subject to any disclaimer, the term of this patent is extended or adjusted under 35 U.S.C. 154(b) by 22 days.

(21) Appl. No.: 16/667,397

(22) Filed: Oct. 29, 2019

(65) Prior Publication Data

US 2021/0125410 A1    Apr. 29, 2021

(51) Int. Cl.
*B64F 5/40*    (2017.01)
*B64D 45/00*   (2006.01)
(Continued)

(52) U.S. Cl.
CPC ............ *G06T 19/006* (2013.01); *B64D 45/00* (2013.01); *B64D 47/08* (2013.01); *B64F 5/40* (2017.01);
(Continued)

(58) Field of Classification Search
CPC ......... G06T 19/006; B64F 5/40; B64D 45/00; B64D 47/08; G01S 5/30; G06F 3/14; G09B 19/003
See application file for complete search history.

(56) References Cited

U.S. PATENT DOCUMENTS

| 10,049,111 B2 | 8/2018 | Soldani | |
| 2014/0269212 A1* | 9/2014 | Xiang | G01S 5/30 |
| | | | 367/197 |

(Continued)

FOREIGN PATENT DOCUMENTS

DE    10 2017 219 067 A1    4/2019

OTHER PUBLICATIONS

Extended European Search Report issued in European Application No. 20204668.6 dated Apr. 14, 2021 (10 pages).

(Continued)

*Primary Examiner* — Jitesh Patel
(74) *Attorney, Agent, or Firm* — Nixon & Vanderhye PC

(57) ABSTRACT

Methods and system for locating an event on an aircraft using augmented-reality content, an array of ultrasonic devices configured in mesh topology, and deep learning.

20 Claims, 7 Drawing Sheets

(51) Int. Cl.
    *B64D 47/08*     (2006.01)
    *G01S 5/30*     (2006.01)
    *G06F 3/14*     (2006.01)
    *G06T 19/00*     (2011.01)
    *G09B 19/00*     (2006.01)

(52) U.S. Cl.
    CPC ............... *G01S 5/30* (2013.01); *G06F 3/14* (2013.01); *G09B 19/003* (2013.01)

(56) References Cited

U.S. PATENT DOCUMENTS

| | | |
|---|---|---|
| 2015/0356786 A1 | 12/2015 | Bare et al. |
| 2015/0371541 A1* | 12/2015 | Korman ............... G08G 1/144 340/932.2 |
| 2016/0019212 A1* | 1/2016 | Soldani ............... G06Q 10/20 345/633 |
| 2016/0150195 A1* | 5/2016 | Good ............... B64D 45/00 348/143 |
| 2016/0317122 A1* | 11/2016 | Mendonca ........... A61B 8/5269 |
| 2018/0012411 A1* | 1/2018 | Richey ............... G06T 19/006 |
| 2019/0102488 A1 | 4/2019 | Santarone et al. |

OTHER PUBLICATIONS https://en.wikipedia.org/wiki/Power_Glove (retrieved 2019).
https://en-americas-support.nintendo.com/app/answers/detail/a_id/618 (retrieved 2019).
https://en.wikipedia.org/wiki/Kinect (retrieved 2019).

* cited by examiner

SPATIAL LOCALIZATION USING AUGMENTED REALITY

CROSS-REFERENCE TO RELATED APPLICATIONS

None.

STATEMENT REGARDING FEDERALLY SPONSORED RESEARCH OR DEVELOPMENT

None.

FIELD

The non-limiting technology herein relates to use of an ultrasound sensors network (herein called "Ultrasound") to automatically detect the user location coordinates in an indoor environment with Augmented Reality (herein called "AR") including mobile devices, that enables the user to receive location information in real time; and the use of Deep Learning (herein called "DL") methods with the purpose of improving the aircraft maintenance process, guiding technicians to locate the elements that need to be accessed during the maintenance quickly, with accuracy and precision. In some other aspects, the technology herein relates to methods and systems for locating and navigating an environment, using ultrasound, in some embodiments in combination with deep learning/artificial intelligence image pattern recognition, to assist a user using augmented-reality content on a display device.

BACKGROUND

Currently, the aeronautical maintenance business is facing difficulties in obtaining maintenance technicians to perform their required tasks. In many cases, technicians have inadequate knowledge about the aircrafts that need to be serviced; this leads to the maintenance task being more costly as it may take longer or requiring more than one mechanic to perform the task.

In order to carry out the maintenance tasks, the mechanic typically must initially check if there is any available information about the aircraft in which some maintenance action is required. If there is no advanced information about the need for maintenance on the aircraft, the mechanic should check the logbook of the aircraft to see if there is any pending maintenance to be performed. For the situation in which there is a problem with the aircraft, the first approach is to try to correct the problem. In the case of problems that are not simple, it is possible to verify dispatch of the activity through the use of the Minimum Equipment List (MEL), which is used for determining the aircraft's continued airworthiness. If the defective equipment does not appear in the MEL, it is necessary to perform troubleshooting, that is, to try to solve the problem through a systematic search for the root cause of the problem of the component or its replacement.

This troubleshooting procedure must typically be carried out until the problem can be solved and the aircraft is operational again. If there is a problem in the aircraft, in which the mechanic must perform maintenance procedures, it is necessary to know the location of particular components in the aircraft that may have failed or needs attention, in addition to obtaining the necessary parts, equipment and materials to carry out this activity. The necessary maintenance information can be found in an aircraft maintenance manual (maintenance manuals may contain, for example, removal/installation procedures, troubleshooting, activation/deactivation, etc.) and can be accessed by the mechanic via a printed document and/or a digital file. The mechanic must typically follow all the maintenance steps outlined in the aircraft maintenance manual to ensure proper maintenance of the equipment.

From the aforementioned, the need to have prior knowledge about the aircraft becomes apparent in order to quickly locate and maintain the component that will need the maintenance. In many cases, the components that need to be located are not easily found as they may be hidden within, by or behind, other components of the aircraft such as e.g., panel covers. The faster the maintenance location is found, the faster the maintenance activities can be started.

The difficulty of locating a component can be reduced by coupling a geolocation system between the equipment and the mechanic. Geolocation is used for many different purposes, for example: for navigating in unknown environments, locating objects and identifying places, among other things. However, there is no technology suitable for aircraft maintenance that presents high positioning accuracy, simultaneously, in indoor and outdoor environments. That is, there is no solution that is reliable, effective and efficient for such purposes.

Currently there are a lot of technologies that allow localization. Most of the time, the solution used is based on GPS systems which provide absolute position geocoordinates at high precision. However, GPS has limitations when used indoors or beneath obstructions such as in an airplane cargo bay or under an aircraft fuselage. For GPS to work well, the receiver needs to be within line of sight of GPS satellites. Thus, to overcome the deficiencies of GPS systems, in the last decades, several approaches have emerged that propose solutions, of hardware and software, with adaptations for locations in closed environments. Meanwhile, high location accuracy is helpful for correctly finding the item being searched for and not direct the maintenance user to the wrong location to not delay the execution of a maintenance task.

BRIEF DESCRIPTION OF THE DRAWINGS

The following detailed description of exemplary non-limiting illustrative embodiments is to be read in conjunction with the drawings of which.

DETAILED DESCRIPTION OF PREFERRED EMBODIMENTS

Example non-limiting embodiments find application in improving an aircraft's maintenance process, and quickly guiding the technicians to locate the elements that need to be accessed during the maintenance, with accuracy and precision.

The technology proposed is suited to provide maintenance for a variety of environments and vehicles not limited to: indoor environment, complex structures, aircraft, automobiles, and watercrafts. More specifically, the technology's preferred embodiments in one potential application are incorporated into an aircraft's maintenance system.

Ultrasound technology can be used, among other applications, to locate users in an environment with great precision. As is well known, the operating principle is based on the response time of propagation of ultra-high frequency sound waves emitted by transceiver devices. Sensors measure time of flight or time of arrival (absolute or differential) of emitted ultrasonic pulses. Distance can be calculated for each path between an emitter(s) and the sensor(s) based on the speed of sound. The user's position can be obtained by trilateration of signals from transceiver devices installed in the environment and on the user or on a device the user carries. While such ultrasound technology has been used in the past to determine the pose of a body part of a user (e.g., a hand) relative to an array of sensors and/or emitters (see the Nintendo Power Glove manufactured by Mattel as one example), the present non-limiting technology extends such approaches to make it useful in aircraft maintenance contexts.

Augmented Reality ("AR") is a real-time representation combining the real, physical world and the virtual world within a common user interface. Generally, the virtual information is rendered from the real, physical world using an augmented reality device which may constitute a display device such as a handheld display, goggles or glasses. One AR approach employs transparent lenses to allow the user see the real world through the licenses while displaying virtual objects within the real world scene. Another AR approach uses a camera to capture the real world scene, and combines the captured camera video stream with a virtual artificial display object(s) that appears to the user to be part of the real world scene. Still another AR approach models the real world using 3D graphics techniques, and displays scenes defined by a model of the world plus an additional virtual object(s) that is not part of the world (this approach is sometimes referred to as "mixed reality").

Figure 1:
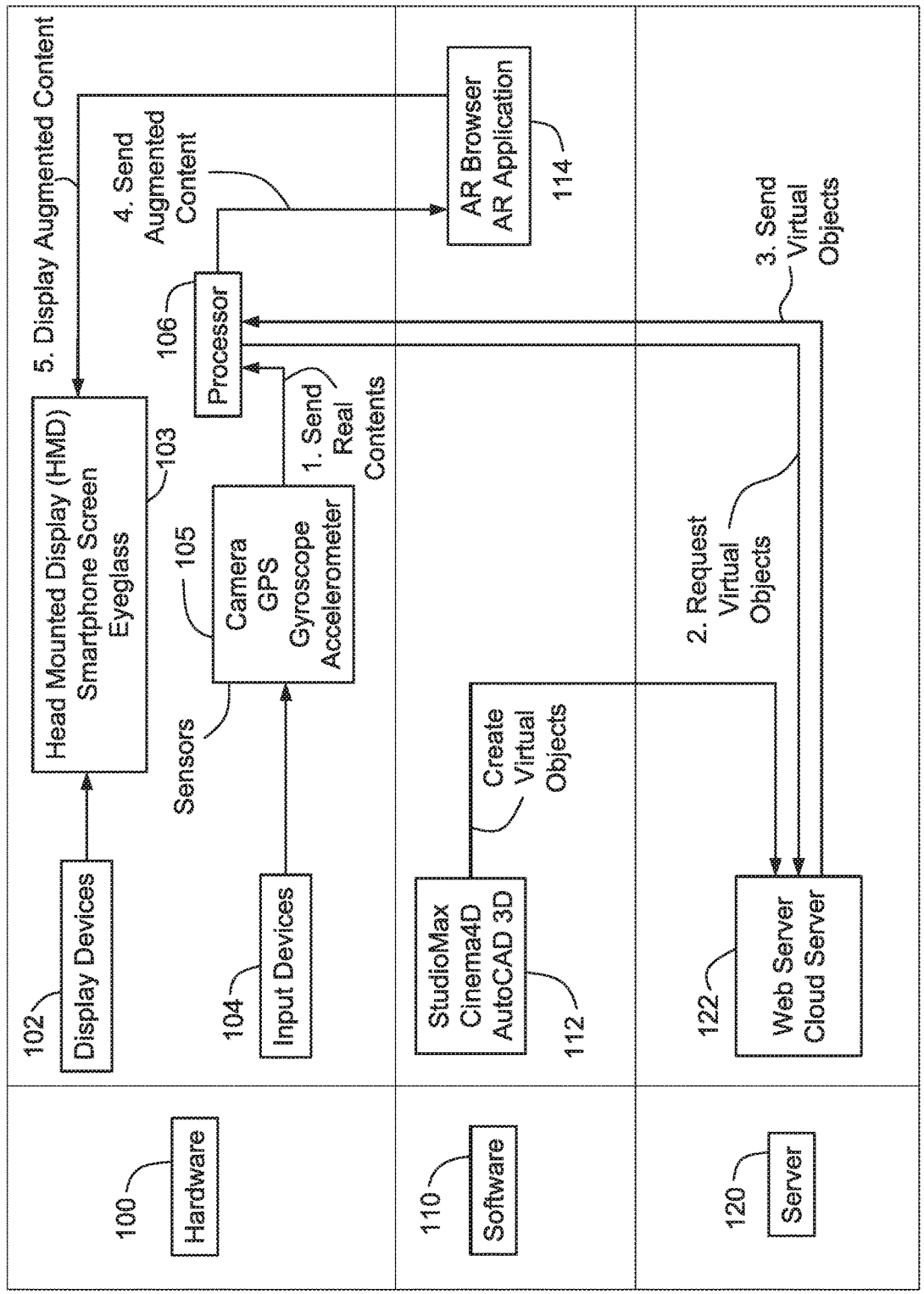
FIG. 1 illustrates example non-limiting components (hardware, software, server) in a prior art AR-Based System.

There are two interrelated elements in most AR-Based Systems. The first element comprises the hardware and software components utilized to implement the AR-Based System. The second element comprises ways in which AR is implemented in a real environment. Three components used in many AR-Based Systems include: the Hardware (100), the Software (200), and a Server (300). FIG. 1 explains the relationship between the three components and how they make AR-Based Systems work.

The hardware (100) in an AR device typically uses modules like Display Devices (102) (e.g., head mounted display (HMD), smartphone screen, eyeglasses, etc.), Input Devices (104) (e.g., sensors such as a: camera, infrared sensor, depth sensor, GPS, gyroscope, accelerometer, etc.), and a Processor (106). The sensors (105) detect the position and the orientation of the display device (102) in or relative to an environment.

The software (110) aspect of an AR device is used in rendering and injecting virtual images into the real world. Software (110) (e.g., StudioMax, Cinema4D, AutoCAD 3D, etc.) is often tasked with generating the virtual images used for overlapping over or combining with live images.

As an AR device requests certain virtual images, the server (120) (e.g., web, cloud, etc.) retrieves and sends the virtual images to the AR devices and is also typically capable of storing virtual images for later use. Some AR systems do not use a server (120) but instead generate virtual images locally or with a peer-to-peer or other computer or network architecture.

The way an AR device interacts with the real world often depends on the availability of the environment. Marker-based and Location-based AR interfaces are two main means of associating the real world with the virtual world. Marker-based AR often has prior knowledge about the environment that the device "sees," whereas location-based AR often does not. Location-based AR works by locating a reference point (e.g. absolute or relative position) in the environment the user is in.

In one example non-limiting implementation, the basic AR processing flow (200) begins with an image captured by a camera or CMOS image sensor (202). This video is broken into frames (204). Each image/frame is processed (206) to detect a marker (220), which in turn is used to determine to identify a position or pose, e.g., relative to a marker. When this marker is detected, the camera position (and in some cases also its orientation) is calculated considering its intrinsic parameters e.g., relative to the marker and thus the environment. Once this position/orientation/pose is defined, the virtual object(s) (208) is rendered in the same image/frame and the translation, rotation, and perspective angles for virtual content are applied for display (210). Such technology is used as one example in the context of video gaming, see "AR Cards" and associated gaming applications of the Nintendo 3DS handheld 3D video game system.

Figure 2:
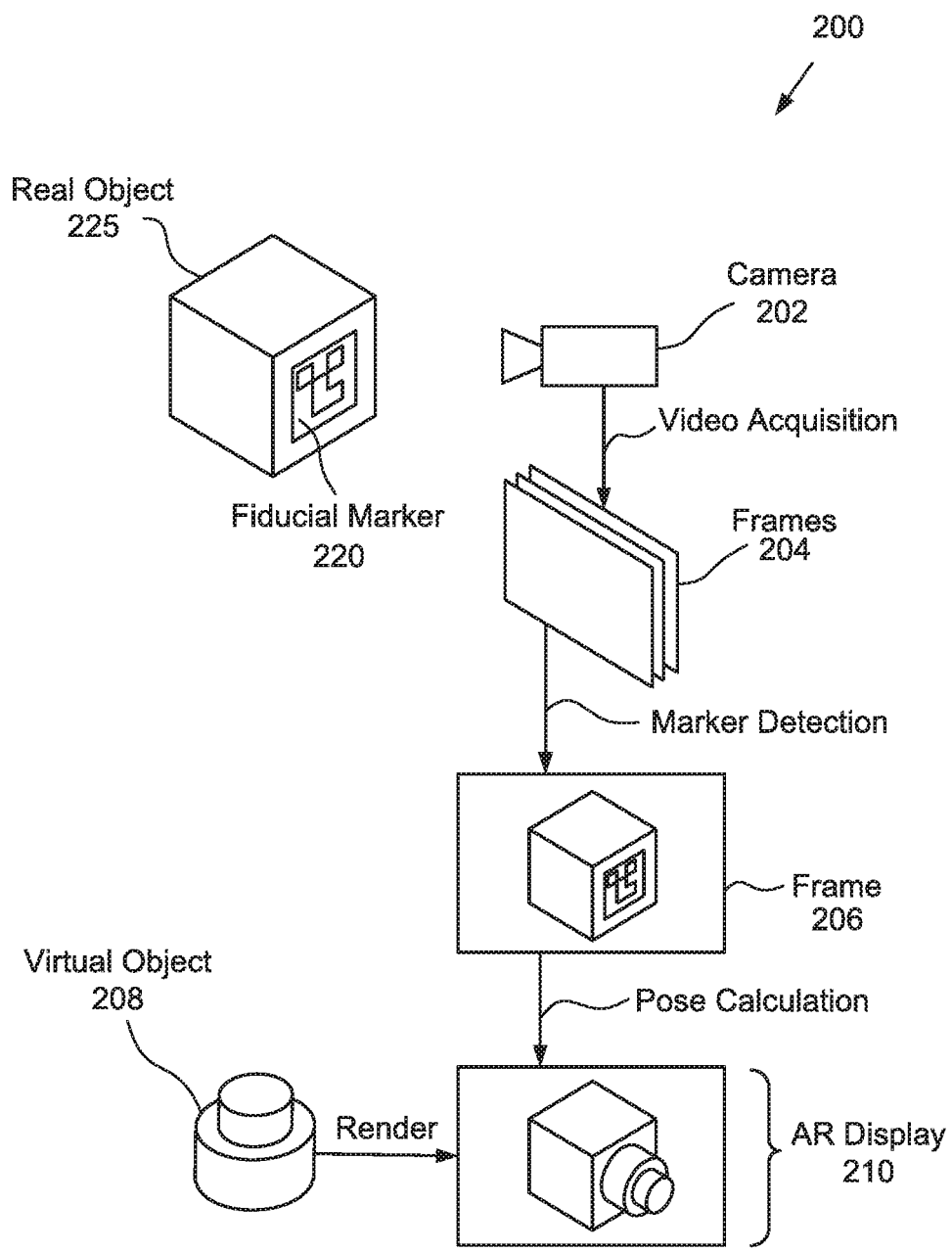
FIG. 2 shows a non-limiting embodiment of an example non-limiting basic AR processing flow.

The fiducial marker (220) is a technique that is often used to allow the AR system to accurately position a virtual object in the real, physical world. The fiducial marker (220) is typically a bidimensional or multidimensional object that is positioned in the scene to be captured, detected by the camera, and then processed, to identify the object's position, as exemplified in FIG. 2. In one embodiment, the fiducial marker (220) comprises a sticker or card that bears a special pattern which is (a) easily recognizable by an image decoder or pattern recognizer, (b) is distinguishable from other fiducial markers also placed in the scene (e.g., it is encoded with a unique, optically-recognizable identifier), and (c) in some cases may be measurable to allow an optical detector to infer its pose (e.g., position and/or orientation or aspects thereof) based on the optically detected pattern. Other fiducial marks may comprise infrared patterns and/or emitters, beacons that emit energy, or other arrangements as known in the art.

It is also possible to use the AR without any artificial fiducial markers or other such elements (220). In this case, a device such as a camera can capture position, orientation and/or pose by detecting natural features in the real, physical world. One example of this technique is the identification by edges or textures of an object based on characteristics of a corresponding 3D model. The correspondence of edges and/or textures permits the natural object to itself serve as the marker, without the need to use a dedicated artificial fiducial marking object (220) that is not part of the real, natural physical world.

Much advancement in this technology is making it possible to use the AR in the aeronautical industry. The 3D models created during aircraft design can be reused, allowing the use of AR in aircraft manufacturing, training, inspection, and maintenance. The use of an AR-based device provides accessibility by showing virtual information in the real, physical world.

The first step of AR tracking is the detection of a known target in an incoming video stream using a detection algorithm, yielding the "pose" (e.g., position and orientation in 6 degrees of freedom) of the camera relative to the target. The detection procedure involves finding a set of matches between the incoming images and a reference image(s), but robust and apt detection of objects for AR is still a challenging problem. Deep Learning techniques will be used to address these target detection problems, since deep convolutional neural networks can be trained to detect targets for augmented reality tracking. The target image is rendered to create many synthetic views from different angles and under different illumination conditions. Therefore, apart from speeding up the classification of the quality or state of the components of the aircraft in the process of identifying faults and defects, deep learning allows these processes to be performed by technicians with a low level of specialization, making them cheaper and allowing smaller numbers of interventions.

The non-limiting technology described herein relates to systems and methods for spatial location of three-dimensional points using combinations of augmented reality, ultrasound (or other geolocation system by active sensors), computer vision and Deep Learning. The exemplary system uses environment reconstruction techniques together with ultrasound to realize the spatial location of a three-dimensional point. Once the desired point is located, its accuracy and precision are enhanced by detecting and processing the region of interest in the image(s) captured by the camera using computer vision techniques and Deep Learning.

Through the information obtained by Ultrasound sensors or other components, which are fixedly distributed in the environment (e.g., mounted on an airplane fuselage), the space in which the user is located is reconstructed or reconstituted. The user also has an ultrasound sensor or emitted that is used to triangulate between the user's point of location and the fixed sensors and/or detectors in the environment.

Figure 3A:
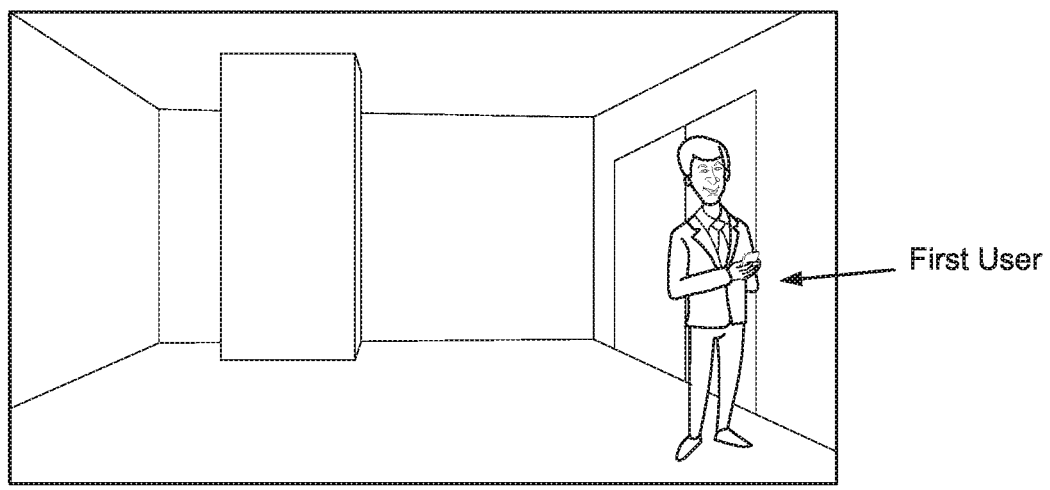
FIGS. 3A, 3B and 3C show non-limiting examples of how events are captured and how they are later used in the non-limiting technology.
Figure 3B:
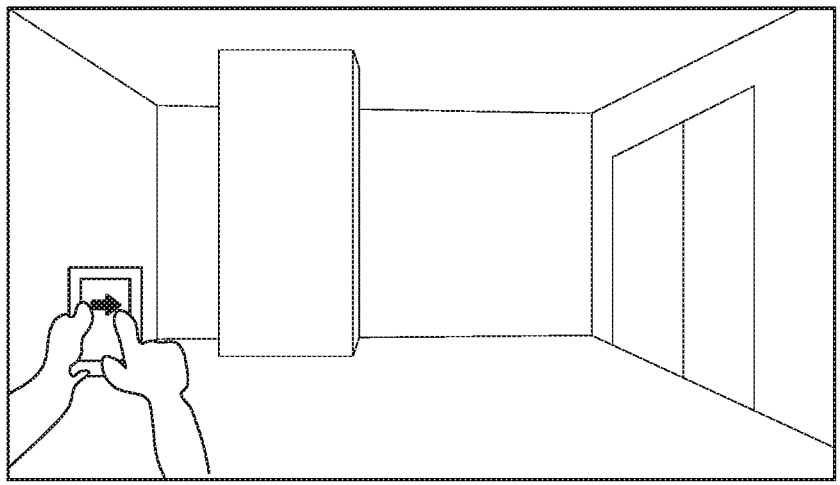
Figure 3C:
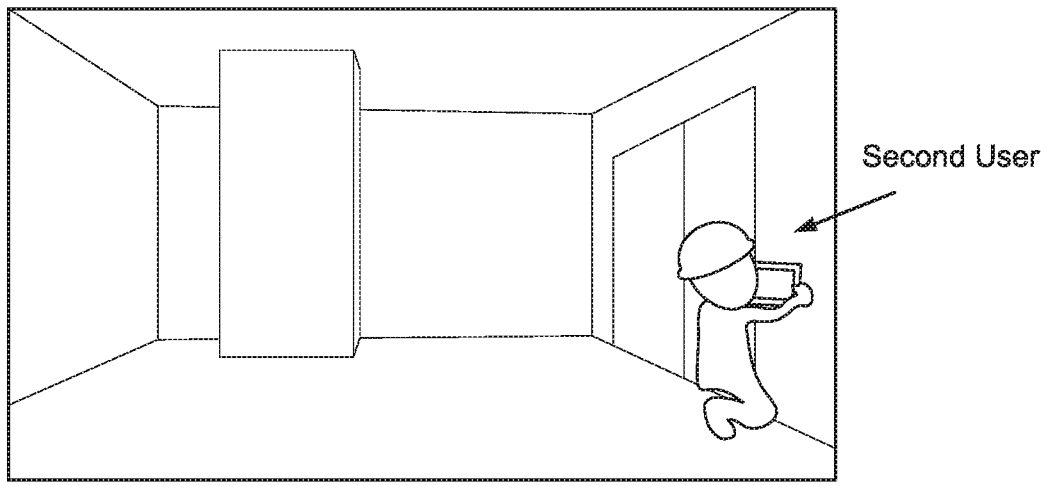

The example methodology starts with the choice of a physical reference that will serve as the origin. This reference is used to calibrate the virtual coordinate systems of the ultrasound and the 3D reconstruction. After calibrating the respective virtual coordinate systems of the ultrasound sensor system and the virtual 3D environment for the same origin (e.g., by transforming the virtual environment to world space as defined by the ultrasound coordinate system), registration of sites of interest by the user, such as sites that need to be monitored in future inspections, called "events," are also registered. The information recorded are the spatial coordinates of the chosen sites and photos of these sites, as shown by FIG. 3-A similar to geomapping commonly used for online mapping of GPS locations such as tourist attractions.

With this information in the system, a different user (e.g., the mechanic) (or the same user at a different, later time) can open the application interface, which will display visual information, such as an arrow through Augmented Reality, to guide the user to the spatial location of the event that was recorded in the prior step (see FIG. 3-B). During the user's path to the marked event (from FIG. 3-A), the user's position (pose) is determined with high precision. Computational vision techniques associated with Deep Learning algorithms are used to enhance the positioning accuracy, so that the application interface can show to the user exactly where the registered event by the initial user (see FIG. 3-C) is located.

Figure 4:
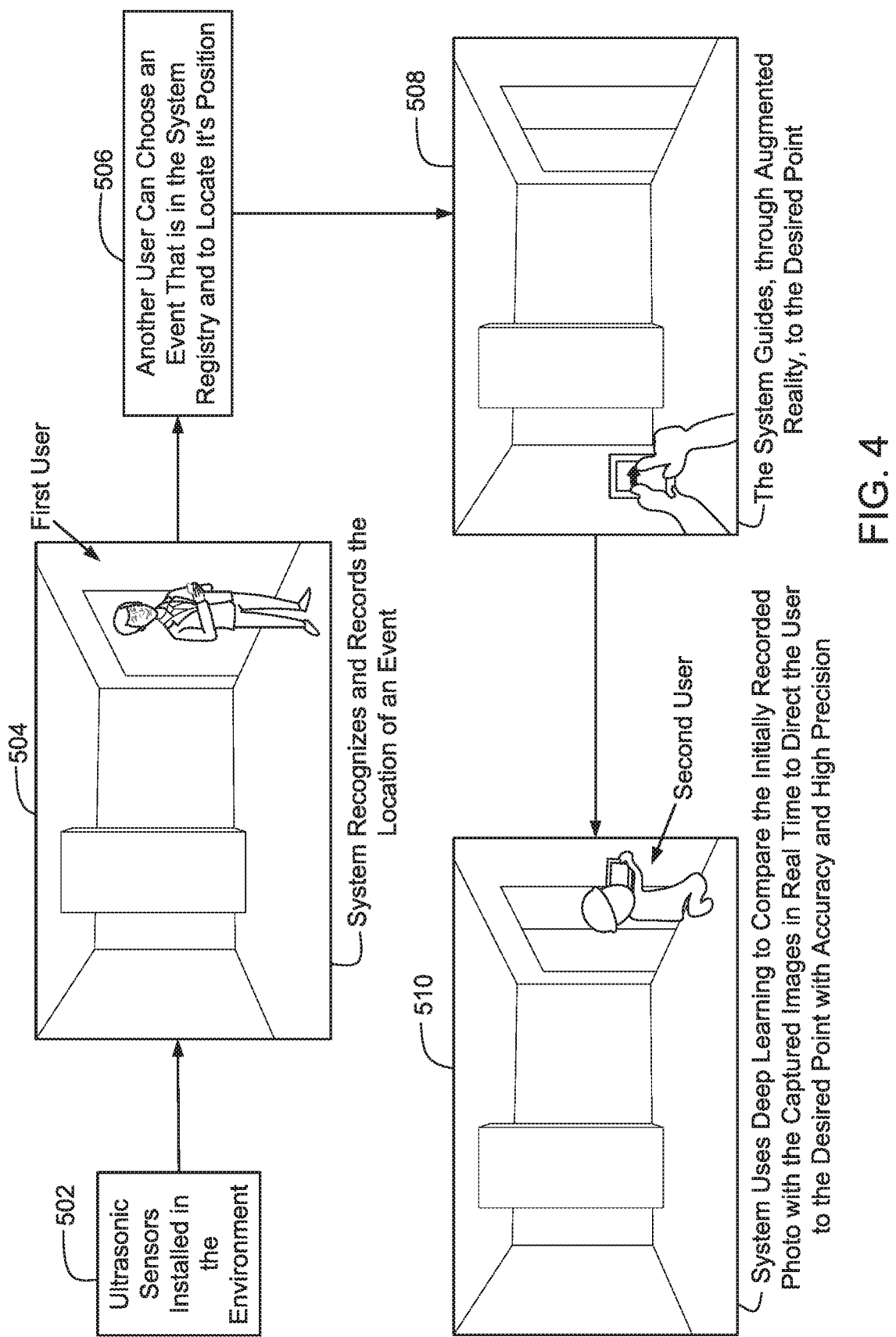
FIG. 4 shows an example non-limiting flowchart of the methodology used in FIGS. 3A, 3B & 3C.

The aim of the computer vision techniques and Deep Learning algorithms is to capture images generated by an input sensor (e.g., a camera) in order to segment and precisely recognize the area of interest, to make a comparison with the images that were registered in the system. An example non-limiting flowchart of this methodology is shown below in FIG. 4.

As mentioned above, for the operation of one proposed no-limiting system, Ultrasound sensors or other components are installed in the environment of interest (502). This ultrasound system is based on the propagation of ultrasonic frequency sound through the air using, for example, a piezoelectric device(s) to generate sound pulses (typically above the range of human hearing, e.g., at 20 KHz or above), allowing the sensors or other components to communicate with each other. These sensors or other components, called "anchors", are fixed in places in the environment and are configured in a mesh topology which can actively track a mobile sensor and/or emitter held or worn by the user. This set of sensors or other components uses electrical energy to perform transmission and signal reception, and to enable triangulation of the user's spatial positioning within the anchor sensor mesh. Generally speaking, a single emitter-sensor pair allows detection of distance, two emitter-sensor pairs (e.g., an emitter and two sensors or a sensor and two emitters) enables determination of a two-dimensional distance vector, and three emitter-sensor pairs enables detection of position coordinates in three dimensions. Additional enhancements (e.g., two sensors mounted close to one another on a handheld device) may be used to detect aspects of orientation to enable sensing of pose in 4 degrees of freedom.

The 3D reconstruction may use cameras, infrared sensors and/or depth sensors (e.g., RADAR and/or LIDAR, or systems such as Microsoft's Kinect 3D sensor) to reconstruct virtually the real environment and thus identify the user's spatial position (e.g., as detected by the ultrasonic system) in relation to the virtual environment (504). The accuracy of the user's position is improved by combining the information obtained by the 3D cameras and the ultrasonic sensor system. In order to further ensure a high precision in the location of an event, techniques of computer vision associated with algorithms of Deep Learning (DL) are applied.

Once the user's position is known, the Augmented Reality system displays the registered event's spatial coordinates and guides the user to the desired event through arrows or other indicators in the mobile device display (and/or may deliver audible instructions to the user such as "walk 10 paces ahead, locate the access panel labeled "'Do Not Step' and turn the handle 90 degrees counterclockwise to release the access panel retaining mechanism"). This system and method for spatial location of three-dimensional points using the combination of these technologies provides better signal spatial coverage, which translates into at least the following advantages: a shorter time for component localization to perform the maintenance task, high precision in the location of the registered events, and greater tolerance to mobile obstacles (e.g., the people traffic, cars and objects in general). Additionally, the use of Augmented Reality can guide the user to the place of interest efficiently and accurately.

In the exemplary embodiment presented below, the expression "events" can mean structural failures (delamination, debonding, cracks, corrosion, etc.) of electrical/hydraulic equipment (avionics, connectors, cables, sensors, tubes, etc.). The present embodiment is exemplary and non-limiting of other applications in the aircraft industry, avionics or other environments which for example direct the user to items of interest other than "events."

Figure 6:
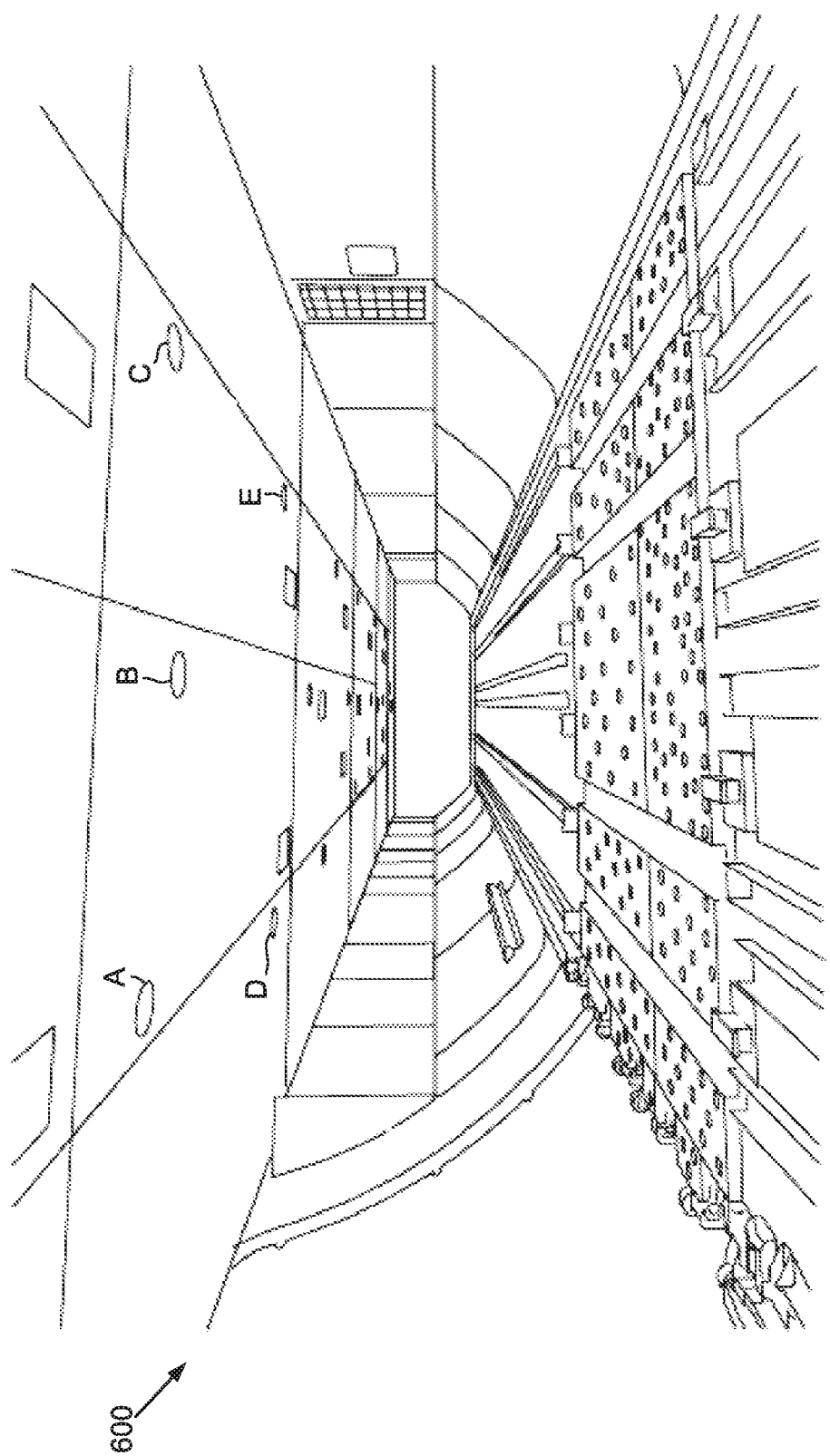
FIG. 6 illustrates a non-limiting embodiment of an array of sensors.

FIG. 6 illustrates a non-limiting embodiment of an array of sensors or other ultrasonic devices, embedded in an avionics compartment 600, configured in a mesh topology, used to determine the location of a display device. In the system described herein, the sensors or other devices (a, b, c, d . . . ) are electronic components capable of transmitting and/or receiving signals in order to determine the location of the display device within an avionics compartment 600.

In one non-limiting embodiment, the embedded array of sensors (a, b, c, d . . . ) or other devices function as ultrasonic sensors configured to sense a signal emitted from a user-carried display device via an emitter component that is either part of the display device or a module attachment to the display device or a device the user wears. In this example, the display device emits ultrasonic sound that the system uses to determine the 3D coordinates of the location (pose) of the display device within the avionics compartment 600.

The emitter of the display device and the array of ultrasonic sensors are operationally coupled to a computing system of the aircraft. The computing system controls when the emitter emits an ultrasonic pulse and/or is notified when the emitter emits a pulse. The computing device (or hardware operatively connected to the computing device) times how long it takes for the emitted signal to reach each sensor of an array of ultrasonic sensors. The computing device uses this timing information to calculate the location of the display device. In one embodiment, the emitter is part of the display device of a user, and the anchors are the array of ultrasonic sensors embedded at known locations on the aircraft fuselage.

Another preferred non-limiting embodiment, the display device is equipped with a sensor or other ultrasonic receiver component that is either part of the display device or a module attachment to the display device. This receiver is configured to sense signals emitted by an array of emitters embedded in the avionics compartment 600 of the aircraft. The emitters can be controlled to emit pulses in a known sequence and/or using conventional signal marking techniques (so the sensor can distinguish the ultrasonic pulses emitted by the various emitters and match up a received pulse with a known emitter location).

In yet another non-limiting embodiment, the display device and/or the anchors of the aircraft are electronic components with transceiving properties. This embodiment is configured so a transceiver emits a pulse which bounces/reflects off of a target and is received by the same or different transceiver anchored onto the avionic compartment 600 or held by the user. Thus, some embodiments can have an active device(s) anchored only within the environment, other embodiments can have an active device(s) mounted on or carried by the user, and still other embodiments can have active devices both in the environment and on the user.

All previously described non-limiting embodiments may be supplemented with an image sensor, that is either part of the display device or a module attachment to the display device, wherein a user determines a physical reference. Furthermore, deep learning image processing techniques are used to determine the location of the display device in the aircraft more accurately in addition to the previously described embodiments. Such deep learning neural networks can be trained using a sequence of known images to for example recognize the features of the environment such as the fuselage of particular aircraft.

Example Use Case

Figure 5A:
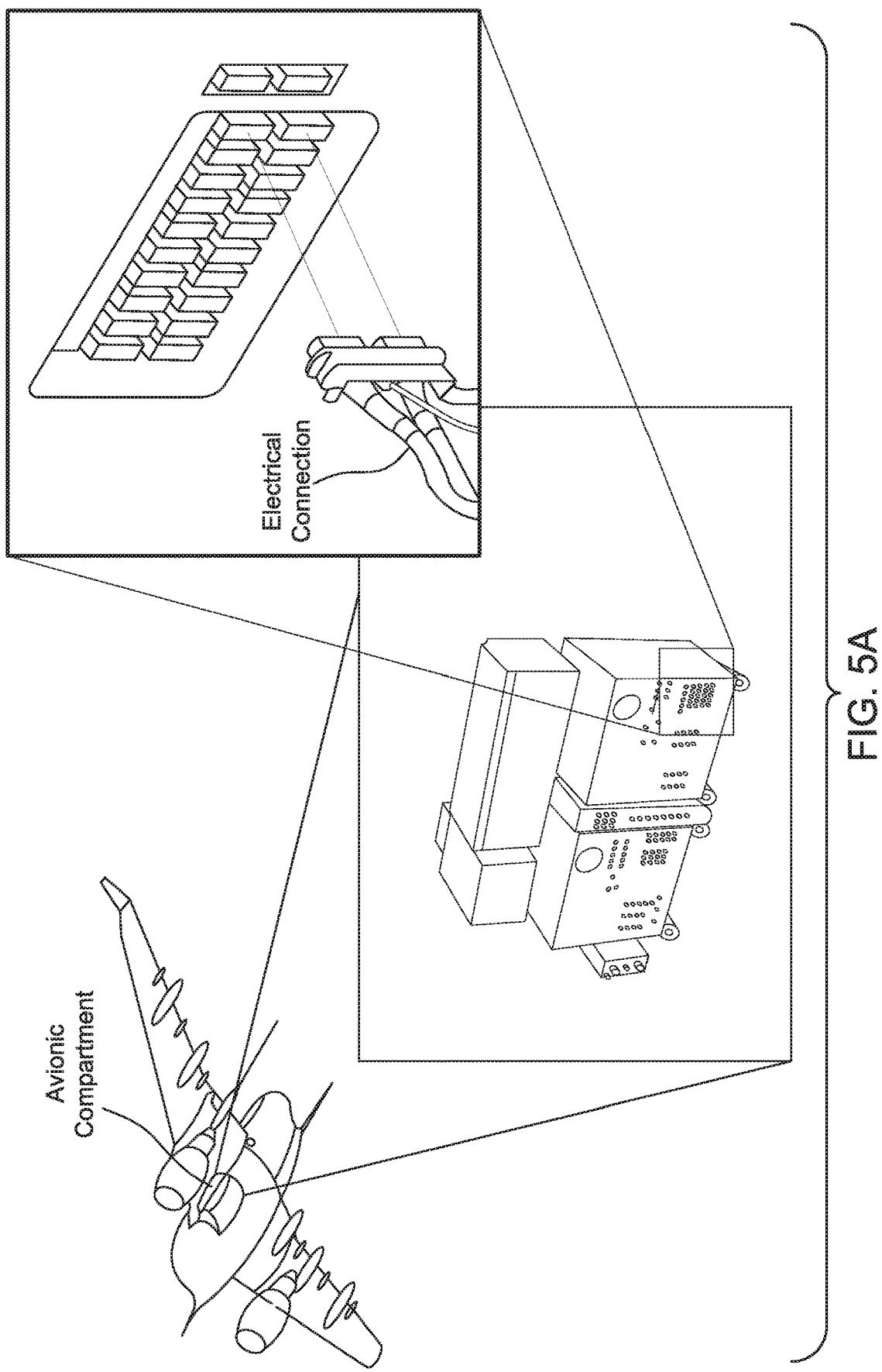
FIGS. 5A & 5B are non-limiting examples wherein the non-limiting technology is applied.
Figure 5B:
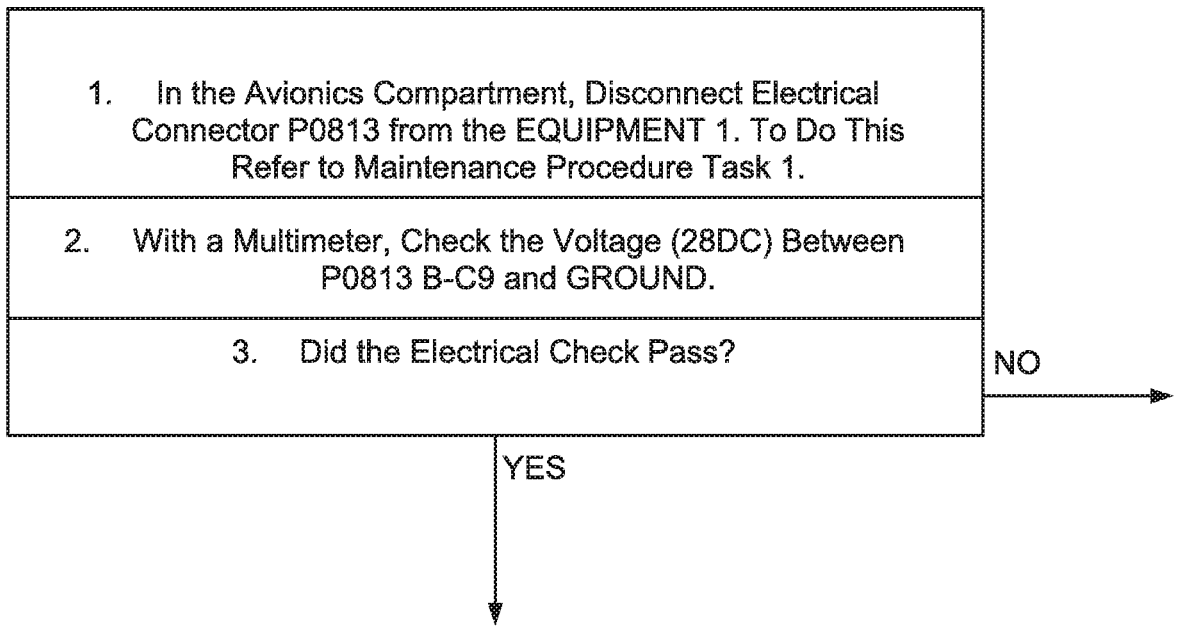

In this example of non-limiting embodiments, the proposed method and system is used for the spatial location of the three-dimensional location of an electrical connector (reference name: P0813) that is in the aircraft avionics compartment (see FIG. 5-A).

Consider a hypothetical situation described below:
a) The aircraft monitoring system informs a fault message;
b) The fault message has an associated troubleshooting procedure;
c) The troubleshooting procedure (see FIG. 5-B) requests a check of an electrical connector (P0813) to correct this failure. This electrical connector is located in the aircraft avionics compartment;
d) The non-limiting technology guides the mechanic to the requested event so that the mechanic can quickly, with accuracy and precision, find the electrical connector P0813 that is located in the aircraft avionics compartment; this enables the mechanic to perform the tasks required by the troubleshooting procedure.

Any patents and publications cited above are hereby incorporated by reference.

While the non-limiting technology has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of locating an event using augmented-reality, comprising;
   a. using a network of ultrasonic transducers, emitting a signal into an environment including an aircraft;
   b. using the network of ultrasonic transducers, detecting the emitted signal;
   c. processing time of flight of the signals between the transducers to determine spatial location of a display device in the environment by triangulation;
   d. using deep learning to detect a physical reference point in the environment; and
   e. displaying, on the display device in response to the determined display device location and the detected physical reference point, augmented-reality content for guiding the display device to an event on or in the aircraft.

2. The method of claim 1, further including using the detected physical reference point to calibrate with a coordinate system of the environment.

3. The method of claim 1, further including registering a spatial coordinate of the event and guiding the display device to the registered event based on the spatial coordinate.

4. The method of claim 1, further including tracking the display device by determining time of flight between at least one ultrasonic emitter and at least one ultrasonic sensor.

5. The method of claim 4, wherein the at least one ultrasonic emitter or the at least one ultrasonic sensor is disposed on the display device.

6. The method of claim 4, further including determining pose of the display device.

7. The method of claim 4, wherein the at least one emitter or the at least one sensor comprises a mesh topology.

8. The method of claim 1, wherein the generated augmented-reality content, displayed by the display device, comprises arrows, text boxes, virtual thermography, and other figures for pointing to the event.

9. The method claim 7, wherein the generated augmented-reality content displayed on the display device provides instructions or other maintenance information.

10. An aircraft system configured to locate an event using mixed-reality content, the system comprising:
   a. a network of ultrasonic devices, at least some of which are embedded in an aircraft, configured to determine the dynamic location of a display device as it moves with respect to an environment containing an aircraft;
   b. an image sensor configured to capture an image of the environment; and
   c. a processor coupled to the image sensor, the processor using the captured image and time of flight of signals between the ultrasonic transducers to determine a reference position in the environment and to use the determined reference position and the determined dynamic location to generate a mixed reality image for display on the display device, the mixed reality image including an indication of at least one part of the aircraft to be maintained.

11. The aircraft system of claim 10, wherein the processor calibrates a coordinate system using the determined reference position and the determined dynamic location.

12. The aircraft system of claim 11, wherein the processor is configured to implement a deep learning neural network to determine the reference position.

13. The aircraft system of claim 10, wherein the processor is coupled to the network of ultrasonic devices and tracks the display device by measuring the changing time of arrival (TOA) of ultrasonic signals exchanged between the ultrasonic devices.

14. The aircraft system of claim 10, wherein the display device includes at least one of the ultrasonic devices.

15. The aircraft system of claim 10, wherein the mixed reality image comprises arrows, text boxes, virtual thermography, and other figures for pointing to an event.

16. The aircraft system of claim 15, wherein the mixed reality image comprises instructions for maintaining the aircraft.

17. A system for locating an event using augmented-reality content, comprising;
   a. a network of ultrasonic devices, capable of receiving and transmitting ultrasonic signals, configured to determine spatial coordinates by measuring time of arrival (TOA) of ultrasonic pulses between the ultrasonic devices;
   b. a further sensor configured to measure a three-dimensional characteristic of an environment including an aircraft; and
   c. at least one processor coupled to the network of ultrasonic devices and the further sensor, the at least one processor being configured to use the determined spatial coordinates and the measured three-dimensional characteristic to position virtual content within a 3D model of the environment.

18. The system of claim 17 wherein the at least one processor is further configured to register an image of an event with respect to the 3D model.

19. The system of claim 17 wherein the at least one processor is further configured to use a deep learning neural network to measure the three-dimensional characteristic.

20. The system of claim 17 further including a mobile display device, the at least one processor being further configured to generate augmented-reality display content on the mobile display device.

* * * * *